(12) United States Patent
Cohen et al.

(10) Patent No.: US 9,378,200 B1
(45) Date of Patent: Jun. 28, 2016

(54) AUTOMATED CONTENT INFERENCE SYSTEM FOR UNSTRUCTURED TEXT DATA

(71) Applicant: EMC Corporation, Hopkinton, MA (US)

(72) Inventors: Raphael Cohen, Beer-Sheva (IL); Alon Grubshtein, Lehavim (IL); Aisling J. Crowley, Cork (IE); Peter R. Elliot, Cork (IE)

(73) Assignee: EMC Corporation, Hopkinton, MA (US)

( * ) Notice: Subject to any disclaimer, the term of this patent is extended or adjusted under 35 U.S.C. 154(b) by 15 days.

(21) Appl. No.: 14/501,407

(22) Filed: Sep. 30, 2014

(51) Int. Cl.
*G06F 17/21* (2006.01)
*G06F 17/27* (2006.01)
*G06F 17/30* (2006.01)
*G06N 5/04* (2006.01)

(52) U.S. Cl.
CPC ...... *G06F 17/2735* (2013.01); *G06F 17/30613* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,765,212 B2 | 7/2010 | Surendran et al. | |
| 7,912,847 B2 | 3/2011 | Lagad et al. | |
| 8,396,741 B2 | 3/2013 | Kannan et al. | |
| 8,458,115 B2 | 6/2013 | Cai et al. | |
| 8,630,961 B2 * | 1/2014 | Beilby | H04L 51/02 706/11 |
| 8,645,395 B2 | 2/2014 | Mushtaq et al. | |
| 8,671,096 B2 * | 3/2014 | Lu | G06F 17/30401 704/9 |
| 8,719,302 B2 | 5/2014 | Bailey et al. | |
| 8,738,361 B2 | 5/2014 | Gryc et al. | |
| 9,146,711 B1 * | 9/2015 | Boudreau | G06F 8/24 |
| 2009/0043797 A1 | 2/2009 | Dorie et al. | |
| 2011/0136542 A1 | 6/2011 | Sathish | |
| 2013/0097167 A1 * | 4/2013 | St. Jacques, Jr. | G06F 17/30011 707/737 |
| 2013/0211880 A1 | 8/2013 | Kannan et al. | |
| 2013/0268534 A1 * | 10/2013 | Mathew | G06F 17/30705 707/740 |
| 2014/0101086 A1 | 4/2014 | Lu et al. | |
| 2015/0077419 A1 * | 3/2015 | Abuelsaad | G06F 17/27 345/440 |

OTHER PUBLICATIONS

J. Chuang et al., "Termite: Visualization Techniques for Assessing Textual Topic Models," Proceedings of the ACM International Working Conference on Advanced Visual Interfaces (AVI), May 2012, pp. 74-77, Capri Island, Naples, Italy.

(Continued)

*Primary Examiner* — Satwant Singh
(74) *Attorney, Agent, or Firm* — Ryan, Mason & Lewis, LLP

(57) ABSTRACT

An apparatus comprises a processing platform configured to implement an automated content inference system for unstructured text data. The automated content inference system comprises a data indexer, a dictionary generator, a topic model generator, and a visualization generator. The data indexer is configured to process the unstructured text data to construct a term index for a given document. The dictionary generator is configured to process the term index to construct an in-domain dictionary. The topic model generator is configured to process the in-domain dictionary to construct a topic model. The visualization generator is configured to provide an output display showing assignment of one or more topics to the given document based on the topic model. The unstructured text data illustratively comprises unstructured service request summaries from a service events database. The unstructured service request summaries may comprise problem summaries and corresponding solution summaries relating to respective service events.

20 Claims, 9 Drawing Sheets

(56) References Cited

OTHER PUBLICATIONS

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.
R. Cohen, "Towards Understanding of Medical Hebrew," Thesis, Ben-Gurion University of the Negev, Nov. 2012, 127 pages.
D.M. Blei et al., "Latent Dirichlet Allocation," Journal of Machine Learning Research, Jan. 2003, pp. 993-1022, vol. 3.
A.K. McCallum, "Mallet: A Machine Learning for Language Toolkit," 2002, 2 pages.
H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.
P.F. Brown et al., "Class-Based n-gram Models of Natural Language," Association for Computation Linguistics, 1992, pp. 467-479, vol. 18, No. 4.
S. Banerjee et al., "The Design, Implementation and Use of the Ngram Statistics Package," Proceedings of the 4th International Conference on Computational Linguistics and Intelligent Text Processing (CICLing), 2003, pp. 370-381.
A. Nenkova et al., "The Impact of Frequency on Summarization," Microsoft Research, Tech. Rep. MSR-TR-2005-101, Jan. 2005, 8 pages.
H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.
J.M. Conroy et al., "Classy Query-Based Multi-Document Summarization," Proceedings of the 2005 Document Understanding Workshop, Oct. 2005, 9 pages.
T. Baumel et al., "Query-Chain Focused Summarization," Proceedings of the 52nd Annual Meeting of the Association for Computational Linguistics, Jun. 2014, pp. 913-922, vol. 1.
G. Erkan et al., "LexRank: Graph-Based Lexical Centrality as Salience in Text Summarization," Journal of Artificial Intelligence Research, Dec. 2004, pp. 457-479, vol. 22.
U.S. Patent Application filed concurrently herewith and entitled "Cluster Labeling System for Documents Comprising Unstructured Text Data."

* cited by examiner

FIG. 4B

Console log:

*Identifier already exists. Any attempt to continue will overwrite existing data gathered during study. Replace name now or continue at own risk...*

402

404

Select unique ID for analysis session:
test1

Data set:
rp_sr_data

Data column:
sr_problem_summary

ID column:
sr_number

[Process data]

Search:

[Download dictionary]

Number of topics:
2 — 50
12

[Run LDA]

[Download topic limits]
[Download topics summary]

Topics Analysis

Toggle View

Data explorer - Dictionary

406

| term | term_freq |
|---|---|
| recoverpoint | 11876 |
| prod | 6124 |
| device | 5616 |
| alarm | 5523 |
| license | 5341 |
| ff | 4515 |
| rpe | 4179 |
| upgrade | 3754 |
| sn | 3254 |
| pn | 3139 |
| foo | 3074 |
| rp | 2796 |
| request | 2759 |
| 100s | 2478 |
| install | 2184 |
| key | 1878 |
| | 1846 |

CONTROL PANEL
SUPPORTS THE FOLLOWING OPERATIONS:
1. SESSION MANAGEMENT
2. DATA SOURCE SELECTION
3. DATA PREPROCESSING (e.g., INVOKES A COMPLEX DICTIONARY CREATION MECHANISM)
4. EXECUTION OF TOPIC MODELING ALGORITHM
5. DOWNLOADING OUTPUTS 1 2 3 4 5 6 7 8 9 10

400

AUTOMATED CONTENT INFERENCE SYSTEM FOR UNSTRUCTURED TEXT DATA

FIELD

The field relates generally to information processing systems, and more particularly to processing of unstructured text data.

BACKGROUND

In many information processing systems, service event analysis relies heavily on inefficient manual activities. For example, it is common in some systems for service personnel to be required to complete forms describing problems experienced by customers and the manner in which these problems were resolved. These forms often utilize static sets of predetermined problem and resolution codes that, in the interest of convenience to the service personnel, tend to be overly general and vague.

Supplementary unstructured text data added to such forms is often ignored as it requires special treatment. For example, the unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide automated content inference systems that can process unstructured text data from a service events database in a particularly efficient manner.

In one embodiment, an apparatus comprises a processing platform configured to implement an automated content inference system for unstructured text data of one or more documents obtained from a service events database.

The automated content inference system comprises a data indexer, a dictionary generator, a topic model generator, and a visualization generator. The data indexer is configured to process the unstructured text data to construct a term index for a given document. The dictionary generator is configured to process the term index to construct an in-domain dictionary. The topic model generator is configured to process the in-domain dictionary to construct a topic model. The visualization generator is configured to provide an output display showing assignment of one or more topics to the given document based on the topic model.

The unstructured text data in some embodiments illustratively comprises unstructured service request summaries from a service events database. For example, the unstructured service request summaries may comprise problem summaries and corresponding solution summaries relating to respective service events.

The illustrative embodiments provide a number of significant advantages relative to the conventional arrangements described previously. For example, these embodiments avoid the need for manual screening in which a corpus of unstructured text data is reviewed and sampled by service personnel.

Moreover, the automated content inference systems in the illustrative embodiments are data driven in that relevant topics are elevated automatically from the actual unstructured text data itself rather than determined by attempting to impose a limited set of predefined themes on the unstructured text data. As a result, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, automated content inference systems as disclosed herein can provide significant insights into unstructured text data in a very short period of time. Particular studies can be configured and executed quickly, with large quantities of analysis output being available almost immediately. Also, such studies can be easily reconfigured and repeated as needed using different sets of parameters.

Embodiments of the invention include, without limitation, apparatus, systems, methods, and articles of manufacture comprising processor-readable storage media.

BRIEF DESCRIPTION OF THE DRAWINGS

FIGS. 4A through 4D show different aspects of a user interface display generated by an automated content inference system in an illustrative embodiment.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
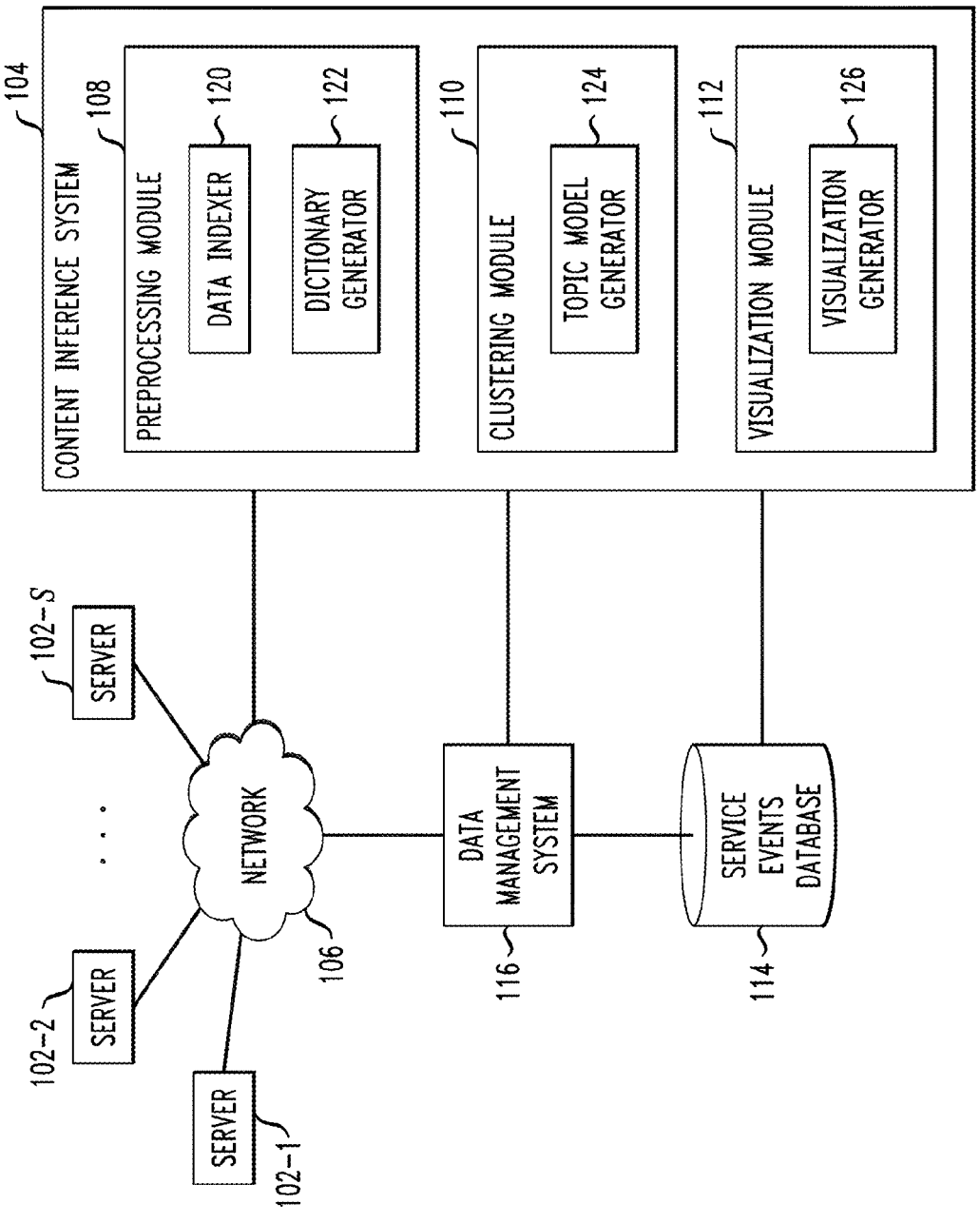
FIG. 1 is a block diagram of an information processing system that includes an automated content inference system in an illustrative embodiment of the invention.

FIG. 1 shows an information processing system 100 configured in accordance with an illustrative embodiment of the present invention. The information processing system 100 is assumed to be built on at least one processing platform and provides automated content inference functionality.

The information processing system 100 in this embodiment illustratively comprises a plurality of servers 102-1, 102-2, . . . 102-S and an automated content inference system 104, all of which are coupled to and communicate over a network 106. The content inference system 104 is separated into a plurality of functional modules, including a preprocessing module 108, a clustering module 110 and a visualization module 112.

The content inference system 104 is coupled to a service events database 114. The service events database 114 stores unstructured text data in the form of multiple documents each relating to one or more service events arising within the system 100 or within associated systems not explicitly shown. The service events database 114 illustratively comprises one or more storage disks, storage arrays, electronic memories or other types of memory, in any combination. Although shown as separate from the content inference system 104 in FIG. 1, the service events database 114 in other embodiments can be at least partially incorporated within the content inference system 104, or within one or more other system components.

The documents stored in the service events database 114 need not be in any particular format or formats, but generally comprise unstructured text data, possibly in combination with other types of data such as structured text data. Moreover, a given set of documents subject to processing in embodiments of the invention can illustratively include documents of a variety of different formats. The term "document" as used herein is therefore intended to be broadly construed.

In the present embodiment, the content inference system 104 and the service events database 114 are associated with a data management system 116. The content inference system 104 can communicate directly with the service events database 114 and the data management system 116, and additionally or alternatively can communicate with these system components via the network 106.

The content inference system 104 more particularly comprises a data indexer 120 and a dictionary generator 122, both implemented in the preprocessing module 108, a topic model generator 124 implemented in the clustering module 110, and a visualization generator 126 implemented in the visualization module 112.

The data indexer 120 is configured to process unstructured text data of one or more documents obtained from the service events database 114 in order to construct a term index for a given document. The unstructured text data illustratively comprises unstructured service request summaries, such as problem summaries and corresponding solution summaries, relating to service events. In some embodiments, the unstructured text data has structured data associated therewith in the service events database 114 and the term index is based on both the unstructured text data and the associated structured data. Examples of structured data include indications of region, team, etc.

The dictionary generator 122 is configured to process the term index generated by the data indexer 120 in order to construct an in-domain dictionary. In this context, the term "in-domain" refers to a domain comprising specified unstructured text data of one or more documents, although other types of domains can be used in other embodiments. The dictionary generator 122 in the present embodiment is illustratively configured to implement automatic lemmatization and synonym extraction, but in other embodiments different types of dictionary generators may be used.

Additional details regarding exemplary dictionary generation techniques that may be utilized in embodiments of the present invention can be found in R. Cohen, "Towards Understanding of Medical Hebrew," Dissertation, Ben-Gurion University of the Negev, 2012; P. F. Brown et al., "Class-based n-gram models of natural language," Computational Linguistics 18.4 (1992): 467-479; and S. Banerjee et al., "The design, implementation, and use of the ngram statistics package," Computational Linguistics and Intelligent Text Processing 2003:370-381, which are incorporated by reference herein.

The topic model generator 124 is configured to process the in-domain dictionary in order to construct a topic model. In the present embodiment, it is assumed that the topic model generator 124 in generating the topic model utilizes latent Dirichlet allocation (LDA) with asymmetric priors, although other techniques can be used, including, for example, probabilistic latent semantic analysis (pLSA), canonical-correlation analysis (CCA), or combinations of these and other topic modeling algorithms. As will be described in more detail below in conjunction with the user interface of FIGS. 4A through 4D, the topic model generator 124 provides lists of topics at least a subset of which are elevated as respective sets of related terms from the unstructured text data.

Examples of topic modeling algorithms suitable for use in embodiments of the present invention are disclosed in, for example, R. Cohen et al., "Redundancy in electronic health record corpora: analysis, impact on text mining performance and mitigation strategies," BMC Bioinformatics 2013, 14:10; D. M. Blei et al., "Latent dirichlet allocation," The Journal of Machine Learning Research 2003, 3:993-1022; A. K. McCallum, "Mallet: A machine learning for language toolkit," 2002; and H. Wallach et al., "Rethinking LDA: Why priors matter," Advances in Neural Information Processing Systems 2009, 22:1973-1981, which are incorporated by reference herein.

The visualization generator 126 is configured to provide an output display showing assignment of one or more topics to the given document based on the topic model. The output display illustratively comprises one of a plurality of user interface displays that are generated under the control of the visualization module 112 and presented on a display screen of a user device not explicitly shown in FIG. 1. For example, such a user device may comprise a computer, mobile telephone or other type of processing device adapted for communication with the content inference system 104 over the network 106.

The service events database 114 may be updated to indicate the assignment of one or more topics to the given document. Such a topic assignment is an example of what is more generally referred to herein as a "content inference."

The automated content inference system 104 is advantageously data driven in that relevant topics are elevated automatically from the actual unstructured text data itself rather than determined by attempting to impose a limited set of predefined themes on the unstructured text data. This provides significant improvements in unstructured text data analysis and visualization relative to the conventional approaches previously described. For example, resulting topic distributions and associated visualizations can be used to identify sets of documents sharing semantic similarity.

The content inference system 104 considerably facilitates text data exploration in large volumes of unstructured text data, and in particular the problem and resolution summaries that are common to service requests. It enables analysts to quickly obtain content inferences from multiple sets of unstructured text data.

The content inference system 104 in the illustrative embodiments does not characterize individual system users but instead models unstructured text data of one or more documents from the service events database 114. By way of example, such an arrangement allows particularly efficient analysis and visualization of overall customer interactions with a corporate or enterprise support organization.

The content inference system 104 in some embodiments is implemented as part of an analysis and visualization tool for unstructured text data analysis and visualization. Such a tool can be associated with the service events database 114, the data management system 116 or another system component.

By way of example, the user interface of FIGS. 4A through 4D can be generated by a tool of this type.

It is to be appreciated that the particular arrangement of system components illustrated in FIG. 1 is exemplary only, and that numerous other arrangements of components may be used in other embodiments. For example, in other embodiments, functionality described herein as being associated with one or more of the data indexer 120, dictionary generator 122, topic model generator 124 and visualization generator 126 may be implemented at least in part using additional or alternative components of the system 100.

The content inference system 104, and possibly other related components of system 100 such as the service events database 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing electronic memory. The term "article of manufacture" as used herein should be understood to exclude transitory, propagating signals.

The one or more processing devices implementing the content inference system 104, and possibly other components of system 100, may each further include a network interface that allows such components to communicate with one another over one or more networks. For example, a given such network interface illustratively comprises network interface circuitry that allows at least one of the data indexer 120, dictionary generator 122, topic model generator 124 and visualization generator 126 to communicate over a network with other components of the system 100 such as servers 102, service events database 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the content inference system 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 6 and 7.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 200 through 210. Steps 200 through 210 are assumed to be performed by the content inference system 104, but one or more of these steps may be performed at least in part by or in conjunction with other system components in other embodiments. Moreover, automated content inference functionality as disclosed herein should not be viewed as being limited in any way to this particular illustrative arrangement of process steps.

In step 200, unstructured text data of one or more documents is obtained by the content inference system 104 from the service events database 114.

In step 202, a term index is constructed for a given document based on the unstructured text data. The term index may be in the form of a document term matrix, or in another suitable format. As noted above, associated structured data may also be taken into account in generating the term index.

In step 204, an in-domain dictionary is constructed based on the term index. As mentioned previously, the in-domain dictionary is assumed to be constructed using automatic lemmatization and synonym extraction.

Steps 202 and 204 in the present embodiment are considered examples of preprocessing steps performed by the respective data indexer 120 and dictionary generator 122 of the preprocessing module 108.

In step 206, a topic model is constructed based on the in-domain dictionary using LDA with asymmetric priors. Additionally or alternatively, one or more other topic modeling algorithms such as pLSA or CCA may be used.

In step 208, one or more topics are assigned to a given document based on the topic model.

Steps 206 and 208 in the present embodiment are considered examples of clustering steps performed by the clustering module 110. The topic model referred to in step 206 is constructed by the topic model generator 124 of the clustering module 110.

In step 210, the service events database 114 is updated to indicate the one or more topics assigned to the given document.

Steps 200 through 210 can be repeated periodically or as needed to process additional documents comprising unstructured text data from the service events database 114.

Also, labels can be assigned to respective clusters of documents, possibly utilizing a cluster labeling system incorporated in or otherwise associated with the content inference system 104. Furthermore, additional analysis or other processing can be performed on labeled clusters of documents.

Figure 2:
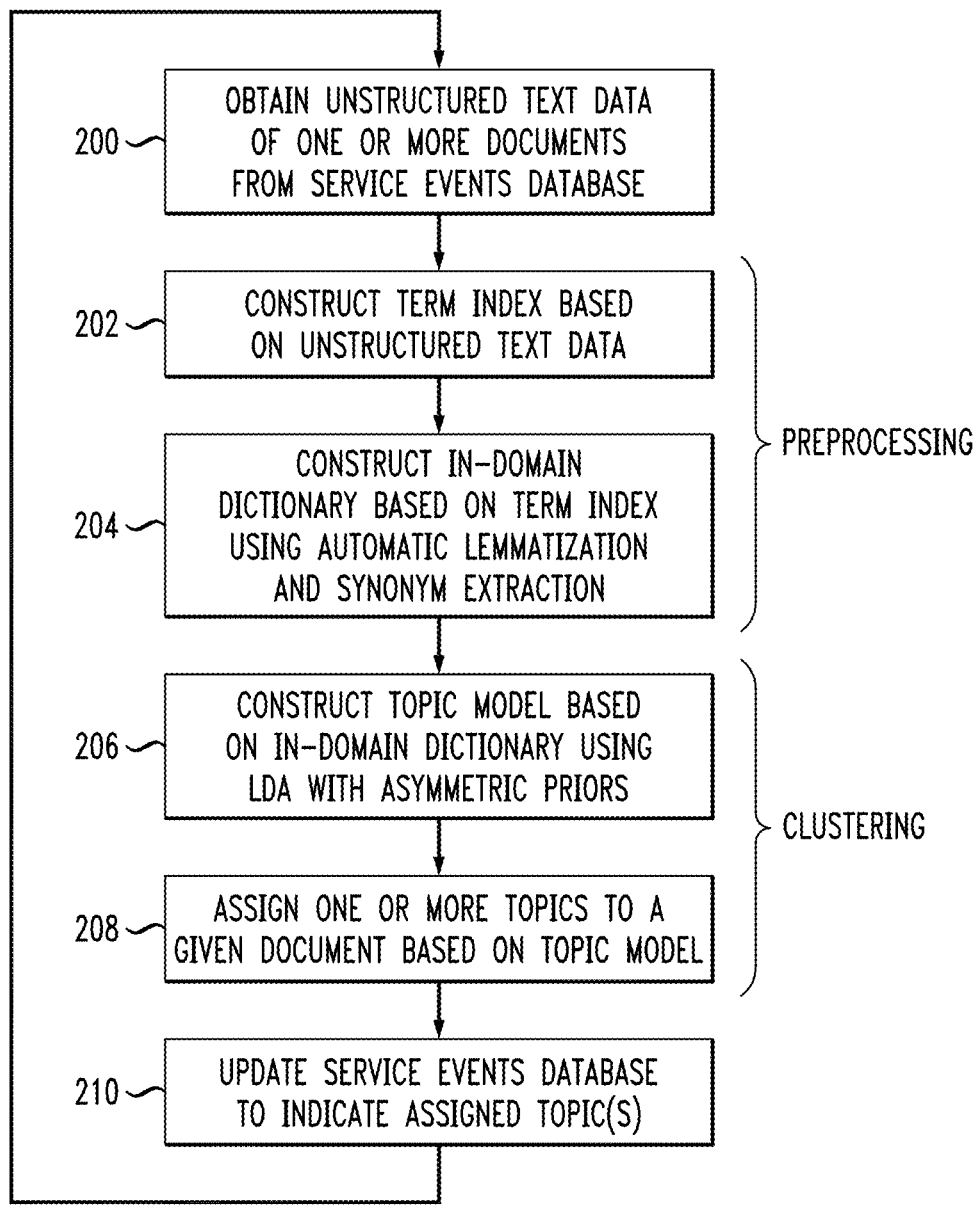
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing an automated content inference system or portions thereof. For example, the ordering of the process steps may be varied in other embodiments, or certain steps may be performed concurrently with one another rather than serially.

It is to be appreciated that automated content inference functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

As mentioned previously, the configuration of information processing system 100 is exemplary only, and numerous other system configurations can be used in implementing an automated content inference system as disclosed herein.

Figure 3:
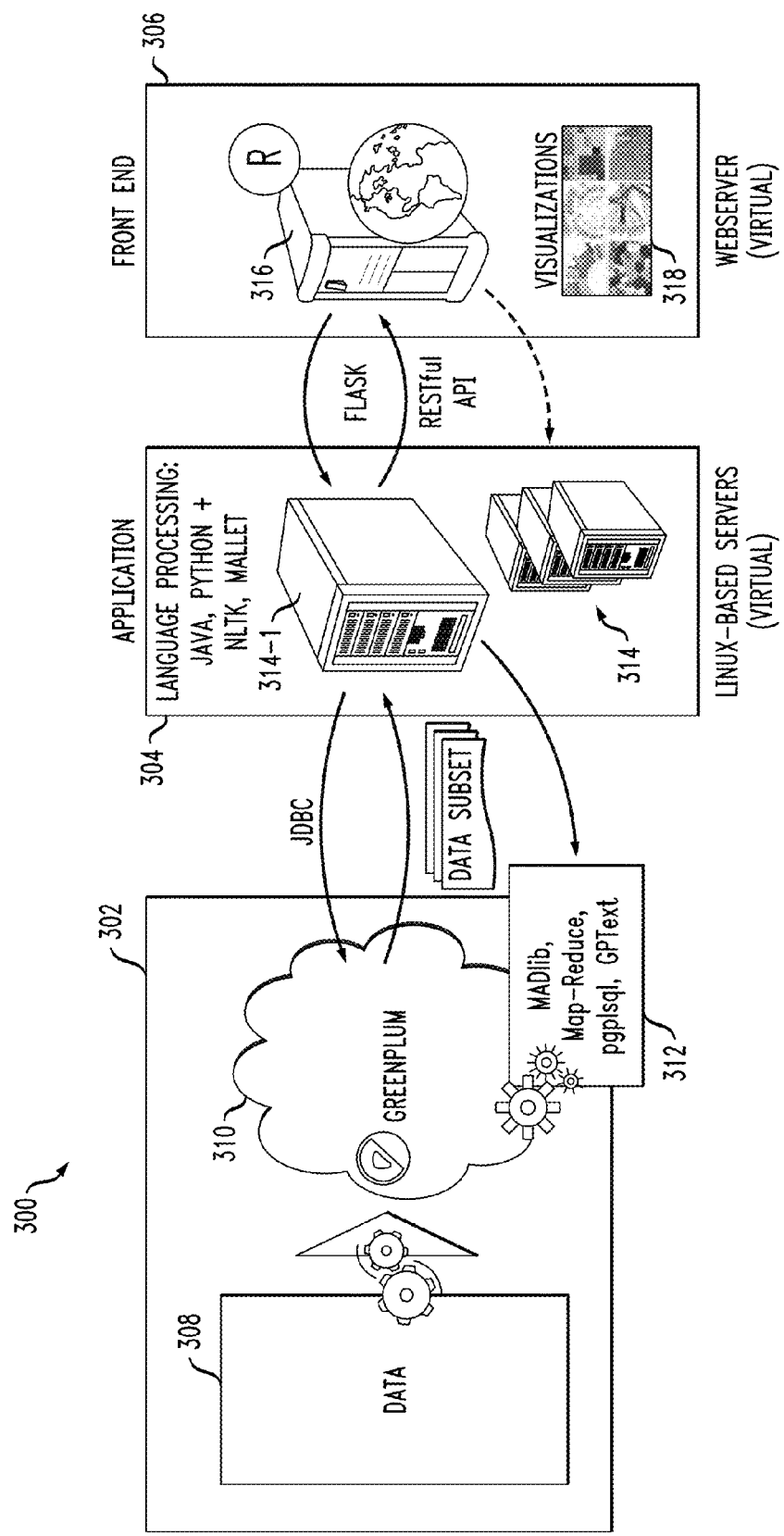
FIG. 3 shows another illustrative embodiment of an information processing system configured to include an automated content inference system.

FIG. 3 shows another example of an information processing system 300 that implements an automated content inference system in an illustrative embodiment. The system 300 comprises a data layer portion 302, an application portion 304 and a front end portion 306. The data layer portion 302 comprises data 308 that is processed by an analytics system 310 illustratively implemented as a Greenplum® system. Additional functional elements 312 illustratively include a plurality of elements for implementing respective MADlib, Map-Reduce, pgplsql and GPText functionality. These elements interact with the analytics system 310 with input from the application portion 304.

The application portion 304 comprises a set of Linux-based servers 314 illustratively implemented using virtual machines. These include a Linux-based server 314-1 that performs language processing using Java, Python Natural Language Toolkit (NLTK) and Mallet. The server 314-1 interacts with the analytics system 310 via Java DataBase Connectivity (JDBC) and receives data subsets therefrom as illustrated.

The front end portion 306 comprises a web server 316 also illustratively implemented using one or more virtual machines and includes a user interface 318 providing visualizations of the type described elsewhere herein. The web server 316 communicates with the server 314-1 via Flask and a RESTful API as illustrated, and may additionally or alternatively communicate with one or more other servers 314 of the application portion 304 via additional connections shown by a dashed arrow in the figure.

The various portions of system 300 are adapted in the present embodiment to implement the functionality of the content inference system 104 as previously described. This particular system configuration is only an example, and numerous other arrangements of system components can be used to provide that functionality.

Referring now to FIGS. 4A through 4D, an exemplary user interface display 400 generated by the content inference system 104 is shown. The same user interface display 400 is shown in each of these figures, but features of different portions of the user interface display are highlighted in FIGS. 4B, 4C and 4D. The user interface display 400 is assumed to be one of a plurality of different user interface displays that are generated by the content inference system 104, possibly in conjunction with an associated analysis and visualization tool.

Figure 4A:
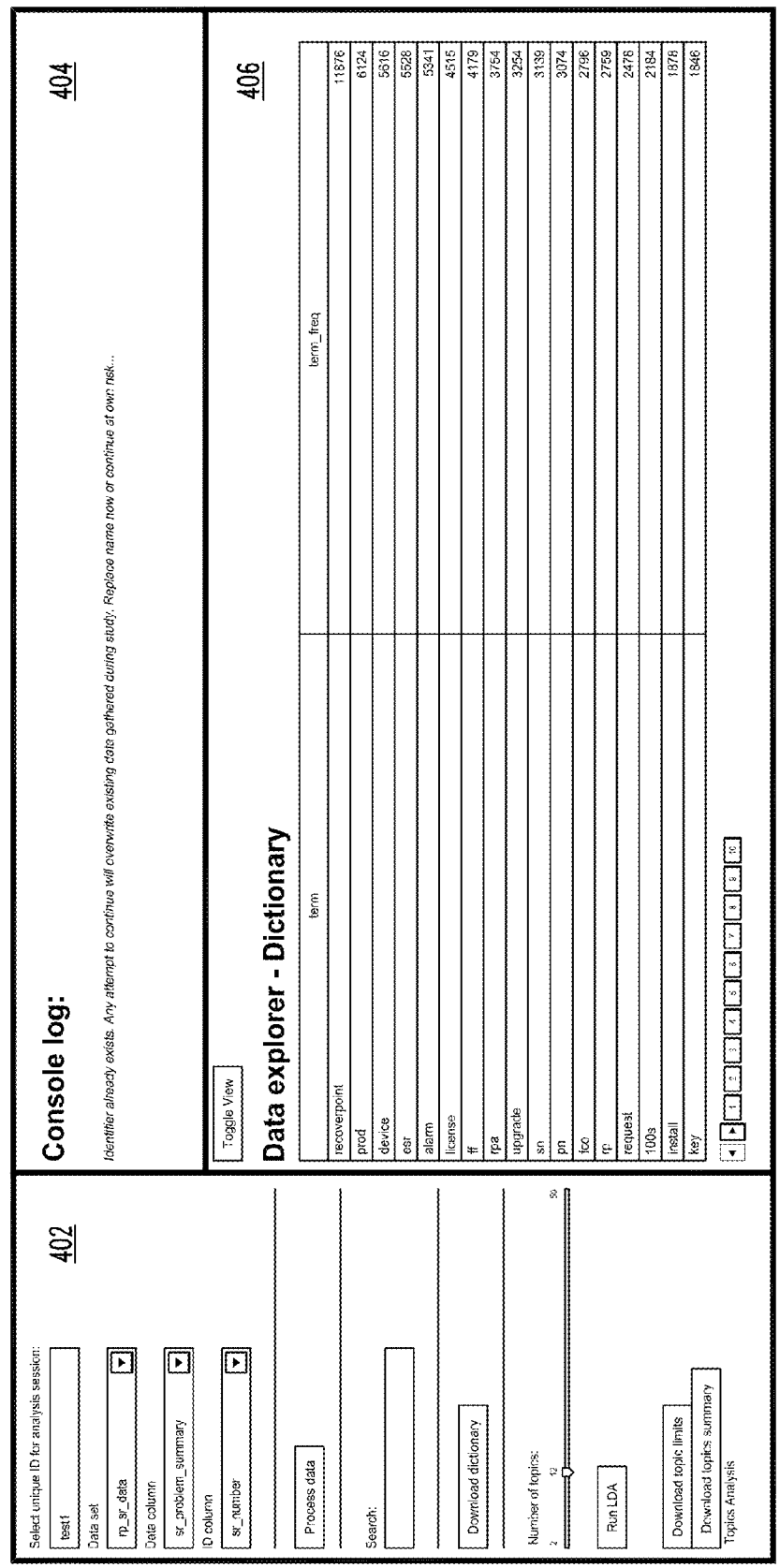

As illustrated in FIG. 4A, the user interface display 400 includes a control panel 402, a console log 404 and a data exploration panel 406.

FIG. 4B indicates that the control panel 402 provides user control functionality for operations that illustratively include session management, data source selection, data preprocessing (e.g., invoking a complex dictionary creation mechanism), topic modeling algorithm execution and downloading of outputs.

Figure 4C:
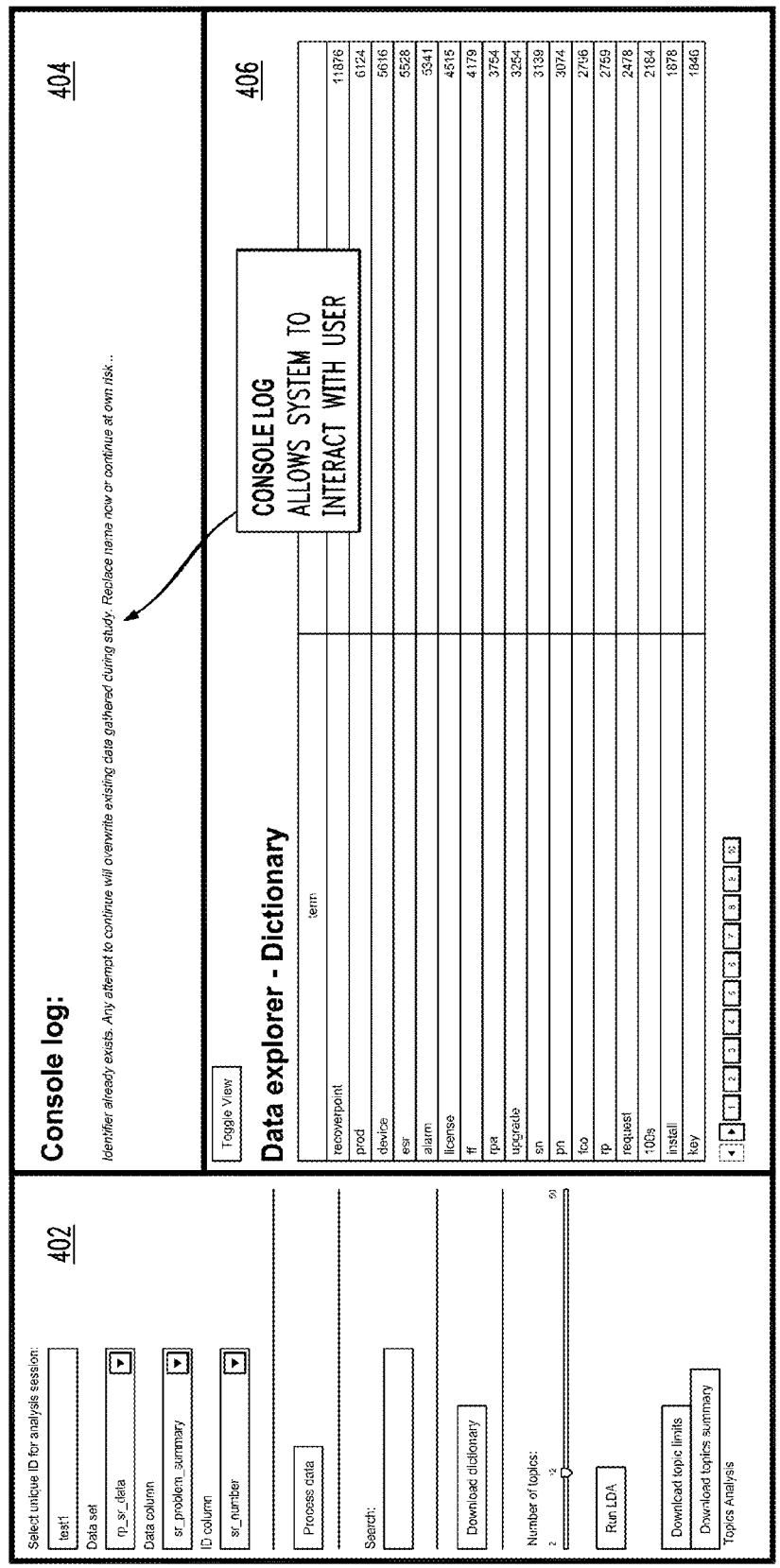

FIG. 4C indicates that the console log 404 supports interaction between the automated content inference system 104 and a user.

Figure 4D:
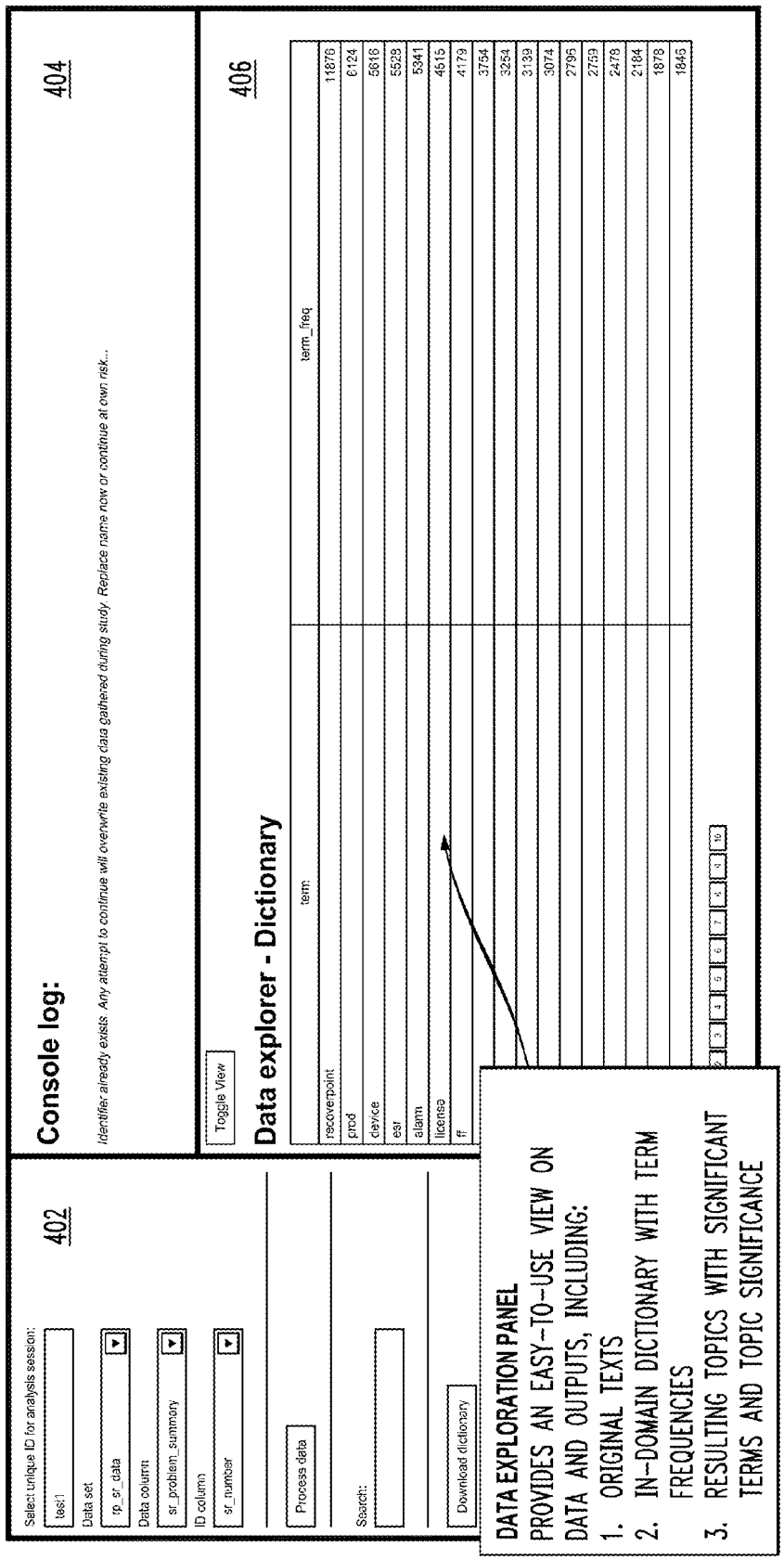

FIG. 4D indicates that the data exploration panel 406 provides multiple selectable views including a text data view, an in-domain dictionary view and a topics view. The text data view shows original texts. The in-domain dictionary view shows the current dictionary with term frequencies. The topics view shows resulting topics with significant terms as well as topic significance.

Figure 5:
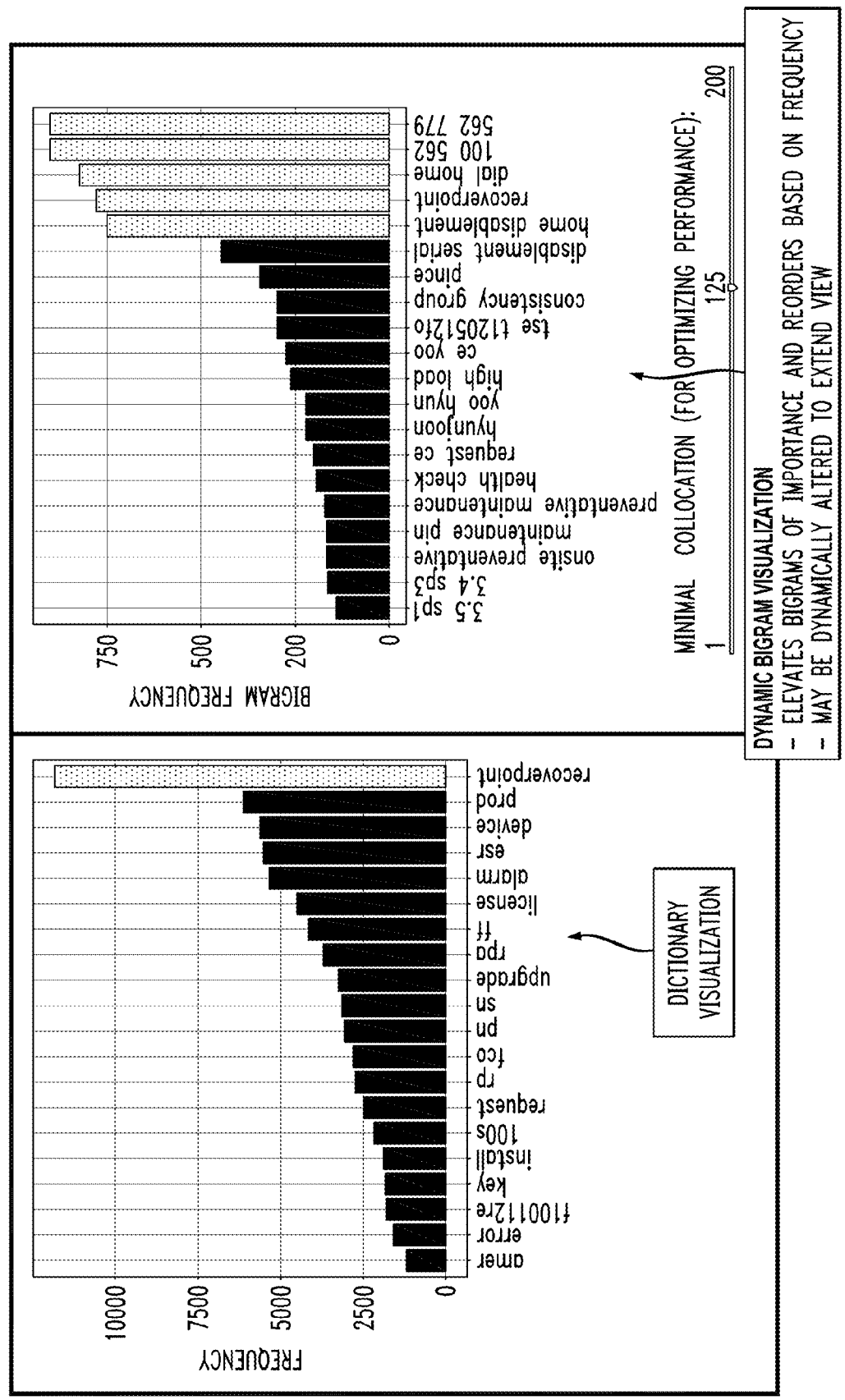
FIG. 5 shows additional output displays generated by an automated content inference system in an illustrative embodiment.

FIG. 5 shows additional output displays generated by the automated content inference system 104 in an illustrative embodiment. These output displays are examples of different types of dictionary visualizations that may be provided in an exemplary in-domain dictionary view of the data exploration panel 406 as highlighted in FIG. 4D. More particularly, the output display on the left side of FIG. 5 includes a dictionary visualization showing dictionary terms and corresponding term frequencies. A corresponding dynamic bigram visualization is shown on the right side of FIG. 5. This visualization elevates bigrams of importance and reorders the bigrams based on frequency. It may be dynamically altered under user control in order to extend the view as desired.

It should be understood that the particular user interface displays and other output displays illustrated in FIGS. 4 and 5 are presented by way of example only, and should not be construed as limiting the scope or functionality of the content inference system 104 in any way.

The illustrative embodiments provide a number of significant advantages relative to the conventional arrangements described above. For example, these embodiments provide automated content inference systems for unstructured text data.

As indicated previously, the automated content inference systems in the illustrative embodiments are data driven in that relevant topics are elevated automatically from the actual unstructured text data itself rather than determined by attempting to impose a limited set of predefined themes on the unstructured text data.

The illustrative embodiments therefore advantageously avoid the need for manual screening in which a corpus of unstructured text data is reviewed and sampled by service personnel.

Furthermore, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, automated content inference systems as disclosed herein can provide significant insights into unstructured text data in a very short period of time. Particular studies can be configured and executed quickly, with large quantities of analysis output being available almost immediately. Also, such studies can be easily reconfigured and repeated as needed using different sets of parameters.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these processing platforms may also be used to implement at least portions of other information processing systems in other embodiments of the invention, such as the information processing system 300 of FIG. 3.

Figure 6:
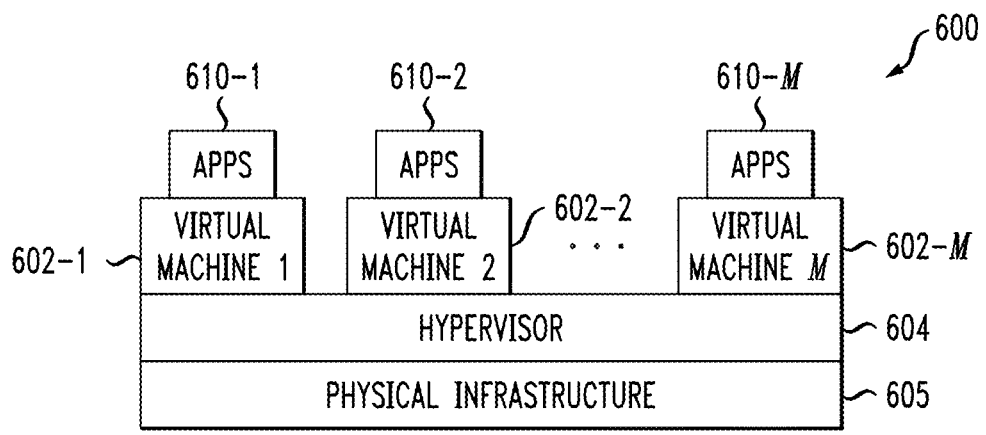
FIGS. 6 and 7 show examples of processing platforms that may be utilized to implement at least a portion of one or more of the information processing systems of FIGS. 1 and 3.
Figure 7:
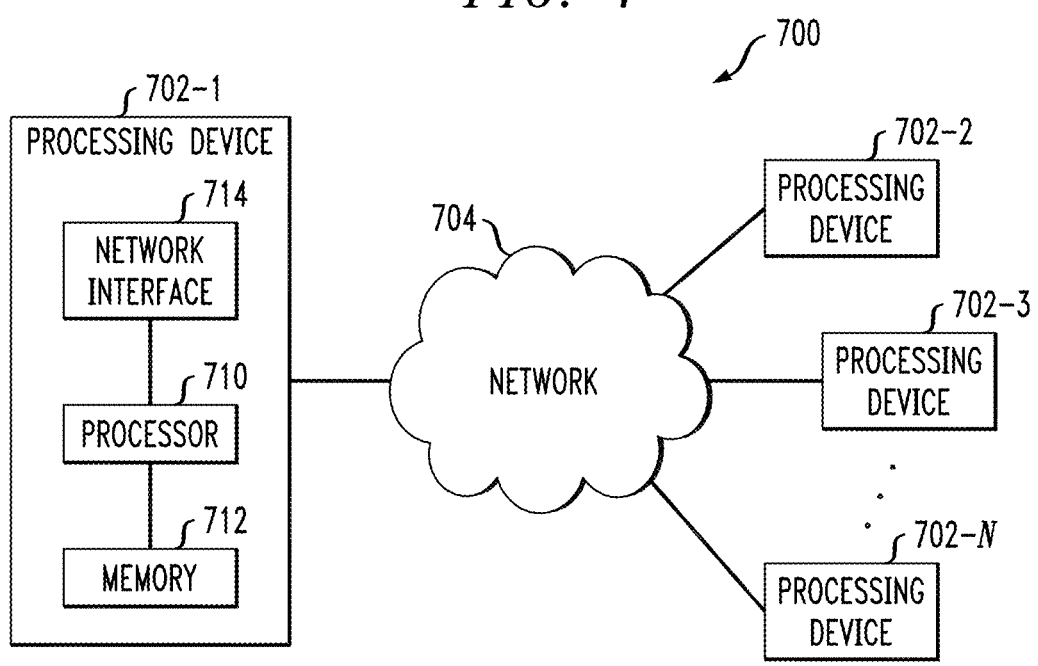

As shown in FIG. 6, portions of the information processing system 100 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system 100 may of course include multiple hypervisors each providing a set of virtual machines using at least one underlying physical machine. For example, different sets of virtual machines provided by respective ones of multiple hypervisors may be utilized in configuring multiple instances of preprocessing module 108, clustering module 110, visualization module 112, or other components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, an FPGA, or other type of processing circuitry, as well as portions or combinations of such circuitry elements.

The memory 712 may comprise RAM, ROM or other types of memory, in any combination. As mentioned previously, the memory 712 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform configured to implement an automated content inference system for unstructured text data of one or more documents obtained from a service events database;
the unstructured text data comprising unstructured service request summaries relating to respective service events;
the processing platform implementing a plurality of servers coupled to the service events database over at least one network;
wherein the automated content inference system comprises:
a data indexer;
a dictionary generator;
a topic model generator; and
a visualization generator;
the data indexer being configured to process the unstructured text data to construct a term index for a given document;
the dictionary generator being configured to process the term index to construct an in-domain dictionary wherein the in-domain dictionary is generated for a domain comprising the unstructured text data;

the topic model generator being configured to process the in-domain dictionary to construct a topic model;

the visualization generator being configured to provide an output display showing assignment of one or more topics to the given document based on the topic model;

wherein the one or more topics assigned to the given document are elevated automatically from the unstructured text data itself utilizing the in-domain dictionary and the topic model without reference to a set of rules characterizing predefined topics; and wherein the processing platform comprises one or more processing devices each comprising a processor coupled to a memory.

2. The apparatus of claim 1 wherein the unstructured service request summaries comprise problem summaries and corresponding solution summaries.

3. The apparatus of claim 1 wherein the unstructured text data has structured data associated therewith in the service events database and the term index is based on both the unstructured text data and the associated structured data.

4. The apparatus of claim 1 wherein the dictionary generator is configured to implement automatic lemmatization and synonym extraction.

5. The apparatus of claim 1 wherein the topic model generator is configured to implement at least one of latent Dirichlet allocation (LDA), probabilistic latent semantic analysis (pLSA) and canonical-correlation analysis (CCA).

6. The apparatus of claim 5 wherein the topic model generator is configured to implement LDA with asymmetric priors.

7. The apparatus of claim 1 wherein the topic model generator provides lists of topics at least a subset of which are elevated as respective sets of related terms from the unstructured text data.

8. The apparatus of claim 1 wherein the service events database is updated to indicate the assignment of one or more topics to the given document.

9. The apparatus of claim 1 wherein the automated content inference system is implemented as part of an analysis and visualization tool for unstructured text data analysis and visualization.

10. The apparatus of claim 9 wherein the analysis and visualization tool comprises a user interface having one or more of a control panel, a console log and a data exploration panel.

11. The apparatus of claim 10 wherein the control panel provides user control functionality for one or more of session management, data source selection, data preprocessing, topic modeling algorithm execution and downloading of outputs.

12. The apparatus of claim 10 wherein the console log supports interaction between the automated content inference system and a user.

13. The apparatus of claim 10 wherein the data exploration panel provides a plurality of selectable views including one or more of a text data view, an in-domain dictionary view and a topics view.

14. An information processing system comprising the apparatus of claim 1.

15. A method comprising steps of:
obtaining unstructured text data of one or more documents from a service events database, the unstructured text data comprising unstructured service request summaries relating to respective service events;

constructing a term index for a given document based on the unstructured text data;

constructing an in-domain dictionary based on the term index wherein the in-domain dictionary is generated for a domain comprising the unstructured text data;

constructing a topic model based on the in-domain dictionary; and providing an output display showing assignment of one or more topics to the given document based on the topic model;

wherein the one or more topics assigned to the given document are elevated automatically from the unstructured text data itself utilizing the in-domain dictionary and the topic model without reference to a set of rules characterizing predefined topics; and wherein the steps are performed by a processing platform comprising one or more processing devices, the processing platform implementing a plurality of servers coupled to the service events database over at least one network.

16. The method of claim 15 wherein constructing the in-domain dictionary comprises performing automatic lemmatization and synonym extraction.

17. The method of claim 15 wherein constructing the topic model comprises performing at least one of latent Dirichlet allocation (LDA), probabilistic latent semantic analysis (pLSA) and canonical-correlation analysis (CCA).

18. The method of claim 17 wherein constructing the topic model comprises performing LDA with asymmetric priors.

19. A non-transitory processor-readable storage medium having one or more software programs embodied therein, wherein the one or more software programs when executed by at least one processing device of a processing platform cause the processing device:

to obtain unstructured text data of one or more documents from a service events database, the unstructured text data comprising unstructured service request summaries relating to respective service events;

to construct a term index for a given document based on the unstructured text data;

to construct an in-domain dictionary based on the term index wherein the in-domain dictionary is generated for a domain comprising the unstructured text data;

to construct a topic model based on the in-domain dictionary; and to provide an output display showing assignment of one or more topics to the given document based on the topic model;

wherein the one or more topics assigned to the given document are elevated automatically from the unstructured text data itself utilizing the in-domain dictionary and the topic model without reference to a set of rules characterizing predefined topics; and wherein the processing platform implements a plurality of servers coupled to the service events database over at least one network.

20. The processor-readable storage medium of claim 19 wherein the output display comprises a bigram visualization in which bigrams comprising respective pairs of terms from the in-domain dictionary are reordered based on frequency.

* * * * *